United States Patent [19]
Canzek

[11] 4,273,425
[45] Jun. 16, 1981

[54] HIGH SPEED CATADIOPTRIC OBJECTIVE LENS SYSTEM

[75] Inventor: Ludvik Canzek, Unterentfelden, Switzerland

[73] Assignee: Kern & Co. A.G., Aarau, Switzerland

[21] Appl. No.: 967,973

[22] Filed: Dec. 8, 1978

[30] Foreign Application Priority Data

Dec. 8, 1977 [CH] Switzerland ............... 15052/77

[51] Int. Cl.³ .................................. G02B 17/08
[52] U.S. Cl. ............................................. 350/444
[58] Field of Search ............................. 350/201

[56] References Cited

U.S. PATENT DOCUMENTS

| | | | |
|---|---|---|---|
| 3,490,831 | 1/1970 | Takahashi | 350/201 |
| 4,088,397 | 5/1978 | Jourdan | 350/201 |
| 4,165,151 | 8/1979 | Momiyama | 350/201 |

Primary Examiner—Conrad J. Clark

[57] ABSTRACT

This invention provides a high speed compact catadioptric, i.e. reflecting-refracting objective system of F/1.2.

The lens system comprises, in accordance with the advance of the light rays, a positive lens with a convex surface toward the object, a lens with front and back surface concave toward the object and with a main mirror surfaced on the peripheral portion of said back surface. A counter-mirror is surfaced to the central portion of said positive lens and a field lens is cemented to the central portion of said lens with the main mirror surfaced thereon. Small zonal errors of spherical aberration, economical production and a reduced sensitivity to machining and mounting errors result from employing only two optical members which carry the mirrors and lens elements.

4 Claims, 4 Drawing Figures

HIGH SPEED CATADIOPTRIC OBJECTIVE LENS SYSTEM

BACKGROUND OF THE INVENTION

1. Field of the Invention

This invention relates to an improved reflecting-refracting high speed objective lens in which all optical elements are assembled in two members.

2. Description of the Prior Art

The reflecting objective lens, as initially used in astronomy, is distinguished by its ideally achromatic image which is exceptionally useful with large focal lengths. A further advantage over refracting lenses is given by the reduced length which enhanced the use of reflecting telephoto lenses in photography.

Recently reflecting lenses have proven very useful for electronic infrared- and night-vision systems featuring high speed—high contrast objectives with reduced image angle. Reflecting-refracting or catadioptric lenses were designed in order to use only spherical mirros, to extend the field of view and to reduce image errors by introducing ordinary refracting lenses for correction purposes. The thus created Maksutov-lens nevertheless exhibits a large zonal error of spherical aberration.

Another similar type, the Mandler-lens, having two member front part (it likewise presents a large zonal error of spheric aberration) is disclosed e.g. in F. I. Halicek, L. Canzek "Zum Korrigieren von Spiegelobjektiven", Deutsche Geodätische Kommission bei der Bayerischen Akademie der Wissenschaften, Reihe A, Helt, 42, München 1963.

A further improvement was brought about by using a one member front lens, the silvered central part of which constitutes the second mirror, while the first or main mirror has a central bore as disclosed by Swiss Pat. No. 542,454.

These known objective lenses nevertheless suffer from at least one of the following short-comings:

(a) A central bore is applied to the main mirror involving a high cost, machining of a ring-shaped lens is difficult, and such a lens has a reduced mechanical stability as compared to a solid lens.

(b) The front lens, the main mirror and the field lens system are rather sensitive to centering. Without exact centering troublesome comatic and astigmatic defects are unavoidable.

(c) Mounting of the field lenses within the objective requires a first precise mount, another mount is necessary for securing the field lens system within the objective housing. This multimounting method involves centering errors which in turn cause coma and astigmatism.

SUMMARY OF THE PRESENT INVENTION

The principal object of this invention is to provide a high speed compact catadioptric objective system of simple construction and high image quality with improved performance with respect to the above mentioned deficiencies.

The optical system of this invention comprises, in accordance with the advance of the light rays, a positive lens with a convex surface toward the object, a solid lens with front and back surface concave toward the object and with a main mirror lens constituted by the peripheral portion of said solid lens, a counter-mirror surfaced to the central portion of said positive lens and a field lens cemented to the central portion of said lens with the main mirror surfaced on the peripheral portion thereof. This catadioptric system comprises only two optical members which carry said mirrors and of which at least one member carries an additional lens element.

The present invention will be described more in detail with reference to illustrative embodiments shown in the accompanying drawings.

DESCRIPTION OF THE PREFERRED EMBODIMENTS

Figure 1:
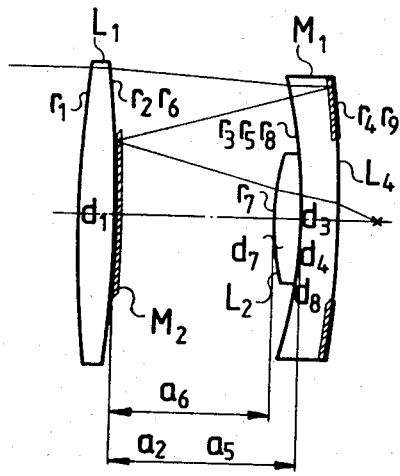
FIG. 1 illustrates a cross section of a first embodiment of the present invention.
Figure 2:
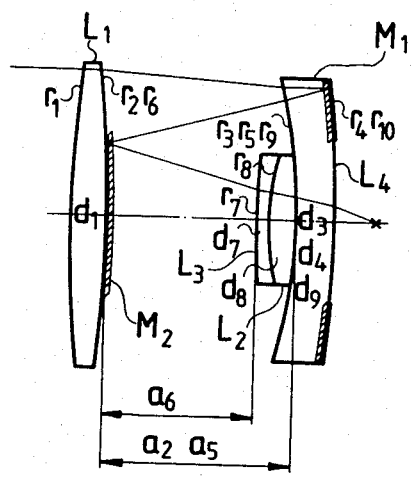
FIG. 2 shows a cross sectional view of a further embodiment of this invention.

The embodiments shown in FIGS. 1 through 4 have only two optical members. As disclosed in FIG. 1 and FIG. 2 a front lens $L_1$ is surfaced with a counter-mirror $M_2$ on the central portion of its back surface facing the image side of the lens system. A main mirror lens $M_1$ is constituted by the outer portion of a solid lens $L_4$, the reflecting back surface of which faces the image side. This lens $L_4$ has no center bore and a field lens $L_2$ as shown in FIG. 1 or $L_2$, $L_3$ as shown in FIG. 2 is cemented to the central portion of lens $L_4$ facing the object side.

Figure 3:
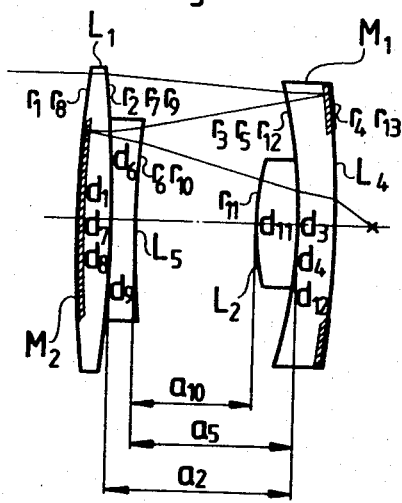
FIG. 3 shows a cross section of a third embodiment of this invention.

In FIG. 3 is shown a third embodiment of the invention likewise comprising a front lens $L_1$, a solid lens $L_4$ and a field lens $L_2$ cemented to the central portion of lens $L_4$. The counter-mirror $M_2$ now is surfaced on the central portion of the front surface of the front lens $L_1$ facing the object side, and an additional lens element $L_5$ is cemented on the central portion of the back surface of lens $L_1$ facing the image side.

Figure 4:
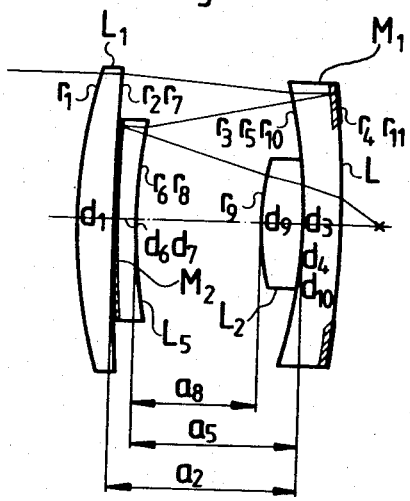
FIG. 4 illustrates a cross section of another embodiment of the present invention.

The objective system illustrated in FIG. 4 also includes a front lens $L_1$, a solid lens $L_4$ and a field lens $L_2$ cemented to the central portion of lens $L_4$. A lens element $L_5$ with the counter mirror $M_2$ surfaced on its back-object side is cemented to the central portion of the surface of front lens $L_1$ facing the image side.

According to the above described construction a high speed catadioptric objective system lens is obtained, the image quality of which features a very reduced sensitivity to centering errors. The examples shown are highly corrected with respect to spherical and chromatic aberration, coma and astigmatism. They allow a compact construction and render superfluous a separate mechanical mount for the field lens system. An economical production and a reduced sensitivity to machining and mounting errors are brought about by the invention as it employs only two optical members for the objective.

The examples 1, 2, 3 and 4 of embodiments described above with reference to FIGS. 1, 2, 3 and 4 are shown in the following tables, where F is the aperture or speed of the lens system, f is the focal length and s' is the back focal distance.

EXAMPLE 1

| | | F = 1:1.2<br>f = 99.7<br>s' = 8.7 | | Thicknesses<br>and<br>Separations | $n_d$ | $v_d$ |
|---|---|---|---|---|---|---|
| $L_1$ | | r1 = +747.831 | | d1 = 7.5 | 1.76180 | 27.0 |
| | | r2 = −2214.349 | | a2 = 46.9 | | |
| $M_1$ | | r3 = −137.033 | | d3 = 8 | 1.68900 | 49.4 |
| | | r4 = −198.791 | | d4 = d3 | | |
| | | r5 = r3 | | a5 = a2 | | |
| $M_2$ | | r6 = r2 | | a6 = 41.9 | | |
| $L_2$ | | r7 = +37.388 | | d7 = 5 | 1.46450 | 65.8 |
| | | r8 = r3 | | d8 = d3 | | |
| $L_4$ | | r8 = r3 | | d8 = d3 | 1.68900 | 49.4 |
| | | r9 = r4 | | | | |

EXAMPLE 2

| | | F = 1:1.2<br>f = 99.5<br>s' = 9.0 | | Thicknesses<br>and<br>Separations | $n_d$ | $v_d$ |
|---|---|---|---|---|---|---|
| $L_1$ | | r1 = + 639.795 | | d1 = 7.5 | 1.74000 | 28.2 |
| | | r2 = − 2444.988 | | a2 = 47.1 | | |
| $M_1$ | | r3 = − 138.122 | | d3 = 8 | 1.68900 | 49.4 |
| | | r4 = − 201.857 | | d4 = d3 | | |
| | | r5 = r3 | | a5 = a2 | | |
| $M_2$ | | r6 = r2 | | a6 = 39.7 | | |
| $L_3$ | | r7 = + 37.94 | | d7 = 2.5 | 1.59551 | 39.2 |
| | | r8 = + 29.527 | | d8 = 4.9 | | |
| $L_2$ | | r8 = + 29.527 | | d8 = 4.9 | 1.46450 | 65.8 |
| | | r9 = r3 | | d9 = d3 | | |
| $L_4$ | | r9 = r3 | | d9 = d3 | 1.68900 | 49.4 |
| | | r10 = r4 | | | | |

EXAMPLE 3

| | | F = 1:1.2<br>f = 99.4<br>s' = 7.6 | | Thicknesses<br>and<br>Separations | $n_d$ | $v_d$ |
|---|---|---|---|---|---|---|
| $L_1$ | | r1 = + 343.171 | | d1 = 7.5 | 1.51454 | 54.7 |
| | | r2 = − 590.667 | | a2 = 53.7 | | |
| $M_1$ | | r3 = − 267.451 | | d3 = 8 | 1.51680 | 64.2 |
| | | r4 = − 420.875 | | d4 = d3 | | |
| | | r5 = r3 | | a5 = 48.9 | | |
| $L_5$ | | r6 = + 212.359 | | d6 = 4.8 | 1.58215 | 42.1 |
| | | r7 = r2 | | d7 = d1 | | |
| $M_2$ | | r8 = r1 | | d8 = d1 | | |
| $L_5$ | | r9 = r2 | | d9 = d6 | 1.58215 | 42.1 |
| | | r10 = r6 | | a10 = 40.9 | | |
| $L_2$ | | r11 = + 35.652 | | d11 = 8 | 1.56883 | 56.1 |
| | | r12 = r3 | | d12 = d3 | | |
| $L_4$ | | r12 = r3 | | d12 = d3 | 1.51680 | 64.2 |
| | | r13 = r4 | | | | |

EXAMPLE 4

| | | F = 1:1.2<br>f = 99.3<br>s' = 10.0 | | Thicknesses<br>and<br>Separations | $n_d$ | $v_d$ |
|---|---|---|---|---|---|---|
| $L_1$ | | r1 = + 174.38 | | d1 = 7.5 | 1.54041 | 51.1 |
| | | r2 = + 1165.501 | | a2 = 46.7 | | |
| $M_1$ | | r3 = − 205.617 | | d3 = 8 | 1.62004 | 36.4 |
| | | r4 = − 280.458 | | d4 = d3 | | |
| | | r5 = r3 | | a5 = 42.4 | | |
| $L_5$ | | r6 = + 369.399 | | d6 = 4.3 | 1.62237 | 36.0 |
| | | r7 = r2 | | d7 = d6 | | |
| $M_2$ | | r7 = r2 | | d7 = d6 | | |
| $L_5$ | | r8 = r6 | | a8 = 32.4 | 1.62237 | 36.0 |
| $L_2$ | | r9 = + 37.489 | | d9 = d10 | 1.46450 | 65.8 |
| | | r10 = r3 | | d10 = d3 | | |
| $L_4$ | | r10 = r3 | | d10 = d3 | 1.62004 | 36.4 |

| | | F = 1:1.2<br>f = 99.3<br>s' = 10.0 | | Thicknesses<br>and<br>Separations | $n_d$ | $v_d$ |
|---|---|---|---|---|---|---|
| r11 | = | r4 | | | | |

It will be appreciated that various modifications and changes of the preferred embodiments described above may be made without leaving the scope of the invention as defined in the accompanying claims.

I claim:

1. A high speed catadioptric objective system lens of the type in which a first single lens ($L_1$) is convergent, with a main mirror ($M_1$), a counter mirror ($M_2$) and a field lens system ($L_2$, $L_4$) adjacent to the focal point, wherein only two optical members carry said mirrors and of which at least one member carries an additional lens element, said counter mirror ($M_2$) surfaced on the central portion of said first single lens ($L_1$) facing the image side and at least one element ($L_2$) of said field lens system cemented to the central portion ($L_4$) of said optical member carrying the main mirror ($M_1$) and facing the object side, the elements having the following numerical values:

| | | F = 1:1.2<br>f = 99.7<br>s' = 8.7 | | Thicknesses<br>and<br>Separations | $n_d$ | $v_d$ |
|---|---|---|---|---|---|---|
| $L_1$ | | r1 = +747.831 | | d1 = 7.5 | 1.76180 | 27.0 |
| | | r2 = −2214.349 | | a2 = 46.9 | | |
| $M_1$ | | r3 = −137.033 | | d3 = 8 | 1.68900 | 49.4 |
| | | r4 = −198.791 | | d4 = d3 | | |
| | | r5 = r3 | | a5 = a2 | | |
| $M_2$ | | r6 = r2 | | a6 = 41.9 | | |
| $L_2$ | | r7 = +37.388 | | d7 = 5 | 1.46450 | 65.8 |
| | | r8 = r3 | | d8 = d3 | | |
| $L_4$ | | r8 = r3 | | d8 = d3 | 1.68900 | 49.4 |
| | | r9 = r4 | | | | | where f is the focal length of the system, r is the radius of curvature of the indicated elements, and $L_4$ is the central portion of the main mirror ($M_1$).

2. A high speed catadioptric objective system lens of the type in which a first sinle lens ($L_1$) is convergent, with a main mirror ($M_1$), a counter mirror ($M_2$) and a field lens system ($L_2$, $L_3$, $L_4$) adjacent to the focal point wherein only two optical members carry said mirrors and of which at least one member carries an additional lens element, said counter mirror ($M_2$) surfaced on the central portion of said first single lens ($L_1$) facing the image side and at least one element ($L_2$) of said field lens system cemented to the central portion ($L_4$) of said optical member carrying the main mirror ($M_1$) and facing the object side, the elements having the following numerical values:

| | | F = 1:1.2<br>f = 99.5<br>s' = 9.0 | | Thicknesses<br>and<br>Separations | $n_d$ | $v_d$ |
|---|---|---|---|---|---|---|
| $L_1$ | | r1 = + 639.795 | | d1 = 7.5 | 1.74000 | 28.2 |
| | | r2 = − 2444.988 | | a2 = 47.1 | | |
| $M_1$ | | r3 = − 138.122 | | d3 = 8 | 1.68900 | 49.4 |
| | | r4 = − 201.857 | | d4 = d3 | | |
| | | r5 = r3 | | a5 = a2 | | |
| $M_2$ | | r6 = r2 | | a6 = 39.7 | | |
| $L_3$ | | r7 = + 37.94 | | d7 = 2.5 | 1.59551 | 39.2 |
| | | r8 = + 29.527 | | d8 = 4.9 | | |
| $L_2$ | | r8 = + 29.527 | | d8 = 4.9 | 1.46450 | 65.8 |
| | | r9 = r3 | | d9 = d3 | | |

-continued

| | F = 1:1.2 | | Thicknesses | | |
|---|---|---|---|---|---|
| | f = 99.5 | | and | | |
| | s' = 9.0 | | Separations | $n_d$ | $\nu_d$ |
| $L_4$ | r9 = r3 | | d9 = d3 | 1.68900 | 49.4 |
| | r10 = r4 | | | | | where f is the focal length of the system, r is the radius of curvature of the indicated elements, and $L_4$ is the central portion of the main mirror ($M_1$).

3. A high speed catadioptric objective system lens of the type in which a first single lens ($L_1$) is convergent, with main mirror ($M_1$), counter mirror ($M_2$) and a field lens system ($L_2$, $L_4$) adjacent to the focal point, wherein only the optical members carry said mirrors and of which at least one member carries an additional lens element, said counter mirror ($M_2$) surfaced on the central portion of said first single lens ($L_1$) facing the object side, said additional lens element ($L_5$) cemented to the central portion of said first single lens ($L_1$) facing the image side, and said field lens ($L_2$) cemented to the central portion ($L_4$) of said optical member carrying the main mirror ($M_1$) and facing the object side, the elements having the following numerical values:

| | F = 1:1.2 | | Thicknesses | | |
|---|---|---|---|---|---|
| | f = 99.4 | | and | | |
| | s' = 7.6 | | Separations | $n_d$ | $\nu_d$ |
| $L_1$ | r1 = + 343.171 | | d1 = 7.5 | 1.51454 | 54.7 |
| | r2 = − 590.667 | | a2 = 53.7 | | |
| $M_1$ | r3 = − 267.451 | | d3 = 8 | 1.51680 | 64.2 |
| | r4 = − 420.875 | | d4 = d3 | | |
| | r5 = r3 | | a5 = 48.9 | | |
| $L_5$ | r6 = + 212.359 | | d6 = 4.8 | 1.58215 | 42.1 |
| | r7 = r2 | | d7 = d1 | | |
| $M_2$ | r8 = r1 | | d8 = d1 | | |
| $L_5$ | r9 = r2 | | d9 = d6 | 1.58215 | 42.1 |
| | r10 = r6 | | a10 = 40.9 | | |
| $L_2$ | r11 = + 35.652 | | d11 = 8 | 1.56883 | 56.1 |
| | r12 = r3 | | d12 = d3 | | |

-continued

| | F = 1:1.2 | | Thicknesses | | |
|---|---|---|---|---|---|
| | f = 99.4 | | and | | |
| | s' = 7.6 | | Separations | $n_d$ | $\nu_d$ |
| $L_4$ | r12 = r3 | | d12 = d3 | 1.51680 | 64.2 |
| | r13 = r4 | | | | | where f is the focal length of the system, r is the radius of curvature of the indicated elements, and $L_4$ is the central portion of the main mirror ($M_1$).

4. A high speed catadioptic objective system lens of the type in which a first single lens ($L_1$) is convergent, with a main mirror ($M_1$), a counter mirror ($M_2$) and a field lens system ($L_2$, $L_4$) adjacent to the focal point, wherein only two optical members carry said mirrors and of which at least one member carriers an additional lens elements, said counter mirror ($M_2$) surfaced on the object side of said additional lens element ($L_5$) and cemented to the cental portion of said first single lens ($L_1$) facing the image side, and said field lens ($L_2$) cemented to the central portion ($L_4$) of said optical member carrying the main mirror ($M_1$) and facing the object side, the elements having the following numerical values:

| | F = 1:1.2 | | Thicknesses | | |
|---|---|---|---|---|---|
| | f = 99.3 | | and | | |
| | s' = 10.0 | | Separations | $n_d$ | $\nu_d$ |
| $L_1$ | r1 = + 174.38 | | d1 = 7.5 | 1.54041 | 51.1 |
| | r2 = + 1165.501 | | a2 = 46.7 | | |
| $M_1$ | r3 = − 205.617 | | d3 = 8 | 1.62004 | 36.4 |
| | r4 = − 280.458 | | d4 = d3 | | |
| | r5 = r3 | | a5 = 42.4 | | |
| $L_5$ | r6 = + 369.399 | | d6 = 4.3 | 1.62237 | 36.0 |
| | r7 = r2 | | d7 = d6 | | |
| $M_2$ | r7 = r2 | | d7 = d6 | | |
| $L_5$ | r8 = r6 | | a8 = 32.4 | 1.62237 | 36.0 |
| $L_2$ | r9 = + 37.489 | | d9 = d10 | 1.46450 | 65.8 |
| | r10 = r3 | | d10 = d3 | | |
| $L_4$ | r10 = r3 | | d10 = d3 | 1.62004 | 36.4 |
| | r11 = r4 | | | | | where f is the focal length of the system, r is the radius of curvature of the indicated elements, and $L_4$ is the central portion of the main mirror ($M_1$).

* * * * *

UNITED STATES PATENT AND TRADEMARK OFFICE
CERTIFICATE OF CORRECTION

PATENT NO. : 4,273,425
DATED : June 16, 1981
INVENTOR(S) : Ludvik Canzek

It is certified that error appears in the above—identified patent and that said Letters Patent are hereby corrected as shown below:

Claim 3, line 5 delete "the" and insert - - two - -; and

Claim 4, line 7 delete "elements" and insert

Signed and Sealed this

Tenth Day of November 1981

[SEAL]

*Attest:*

*Attesting Officer*

GERALD J. MOSSINGHOFF

*Commissioner of Patents and Trademarks*